(12) United States Patent
Sadaki et al.

(10) Patent No.: US 11,052,646 B2
(45) Date of Patent: Jul. 6, 2021

(54) LINING MATERIAL PEELING METHOD

(71) Applicant: IHI Corporation, Tokyo (JP)

(72) Inventors: Akira Sadaki, Tokyo (JP); Jun Maeno, Tokyo (JP); Akito Yamasaki, Tokyo (JP); Tomoko Ebata, Tokyo (JP); Yuichi Takahama, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 16/860,647

(22) Filed: Apr. 28, 2020

(65) Prior Publication Data

US 2020/0254747 A1 Aug. 13, 2020

Related U.S. Application Data

(63) Continuation of application No. PCT/JP2018/040162, filed on Oct. 29, 2018.

(30) Foreign Application Priority Data

Jan. 18, 2018 (JP) .............................. JP2018-006623

(51) Int. Cl.
*B32B 43/00* (2006.01)
*B32B 38/10* (2006.01)

(52) U.S. Cl.
CPC ............ *B32B 43/006* (2013.01); *B32B 38/10* (2013.01); *Y10T 156/1126* (2015.01); *Y10T 156/1153* (2015.01); *Y10T 156/1911* (2015.01); *Y10T 156/1928* (2015.01)

(58) Field of Classification Search
CPC . B32B 38/10; B32B 43/006; Y10T 156/1126; Y10T 156/1153; Y10T 156/1928; Y10T 156/1911

See application file for complete search history.

(56) References Cited

U.S. PATENT DOCUMENTS

| 5,025,632 | A | 6/1991 | Spritzer |
| 2006/0053165 | A1 | 3/2006 | Hume et al. |
| 2010/0132747 | A1 | 6/2010 | Smith et al. |
| 2012/0171385 | A1 | 7/2012 | Quintard et al. |
| 2019/0061073 | A1* | 2/2019 | Bogue ...................... B64F 5/40 |

FOREIGN PATENT DOCUMENTS

| JP | 59-138605 A | 8/1984 |
| JP | 07-164445 A | 6/1995 |
| JP | 2000-038776 A | 2/2000 |
| JP | 2002-301424 A | 10/2002 |
| JP | 2002-301425 A | 10/2002 |
| JP | 2004-255795 A | 9/2004 |
| JP | 2008-272995 A | 11/2008 |
| JP | 2010-012405 A | 1/2010 |
| JP | 2013-505129 A | 2/2013 |
| WO | 98/000608 A1 | 1/1998 |

\* cited by examiner

*Primary Examiner* — Mark A Osele
*Assistant Examiner* — Nickolas R Harm
(74) *Attorney, Agent, or Firm* — Volpe Koenig

(57) ABSTRACT

In a lining material peeling method of peeling a lining material, which is fixedly formed on a surface of a base material, from the base material, a liquefied fluid which evaporates after injection is injected to a boundary between the base material and the lining material.

8 Claims, 10 Drawing Sheets

LINING MATERIAL PEELING METHOD

CROSS-REFERENCE TO RELATED APPLICATIONS

This application is a Continuation Application based on International Application No. PCT/JP2018/040162, filed Oct. 29, 2018, which claims priority on Japanese Patent Application No. 2018-006623, filed Jan. 18, 2018, the contents of which are incorporated herein by reference.

TECHNICAL FIELD

The present disclosure relates to a lining material peeling method.

BACKGROUND

For example, in some cases, a lining material may be fixedly formed on a base material made of a concrete material or a metal material to impart waterproofness or the like to a structure. Such a lining material is formed by, for example, injecting a plastic material before curing to the base material and then curing the injected plastic material.

For example, Patent Document 1 discloses a lining peeling device for peeling the aforementioned lining material from the base material. The lining peeling device is equipped with a coil which heats the lining material, and a scraper which is inserted between the base material and the lining material which is in a state of being easily peeled off by heating.

DOCUMENT OF RELATED ART

Patent Document

[Patent Document 1] Japanese Unexamined Patent Application, First Publication No. 2008-272995

SUMMARY

However, when a hardly peelable lining material such as polyurea is firmly fixed to the base material, peeling is not facilitated by heating. For this reason, a hardly peelable lining material such as polyurea cannot be peeled from the base material by the lining peeling device disclosed in Patent Document 1. Therefore, there is demand for a method capable of peeling a hardly peelable lining material from the base material without heating.

The present disclosure has been made in view of the above-described problems, and an object thereof is to enable a lining material to be peeled from a base material without heating, in a lining material peeling method.

According to an aspect of the present disclosure, there is provided a lining material peeling method of peeling a lining material, which is fixedly formed on a surface of a base material, from the base material, in which a liquefied fluid which evaporates after injection is injected to a boundary between the base material and the lining material.

In the lining material peeling method according to the aspect, the liquefied fluid may be injected onto a surface of the lining material to form a penetration hole in the lining material, and the liquefied fluid may be injected from the penetration hole to the boundary between the base material and the lining material.

In the lining material peeling method according to the aspect, the liquefied fluid may be injected by a nozzle unit including a tubular body in which a flow path configured to guide the liquefied fluid is formed and which has an injection opening formed at a distal end portion thereof.

In the lining material peeling method according to the aspect, the distal end portion of the tubular portion may be bent or curved and connected to a base portion, and the flow path may be formed in a part including the distal end portion and the base portion.

In the lining material peeling method according to the aspect, in a state in which the distal end portion penetrates the lining material, the liquefied fluid may be injected to the boundary between the base material and the lining material by tilting the tubular portion with respect to the surface of the lining material and by rotating the tubular portion about an axis of the base portion.

In the lining material peeling method according to the aspect, the base material may be a concrete material, and the lining material may be a polyurea material.

In the lining material peeling method according to the aspect, the base material may be a metal pipe, and the lining material may be a fiber-reinforced plastic material.

In the lining material peeling method according to the aspect, the liquefied fluid may be liquid nitrogen.

According to the present disclosure, the lining material is peeled from the base material by an expansion force when the liquefied fluid evaporates. An expansion ratio when the liquid evaporates is, for example, several hundred times or more. For this reason, by utilizing the expansion force of the liquefied fluid, the lining material can be peeled from the base material without heating. Therefore, according to the present disclosure, in the lining material peeling method, the lining material can be peeled from the base material without heating.

DESCRIPTION OF EMBODIMENTS

Hereinafter, an embodiment of a lining material peeling method according to the present disclosure will be described with reference to the drawings.

First Embodiment

Figure 1:
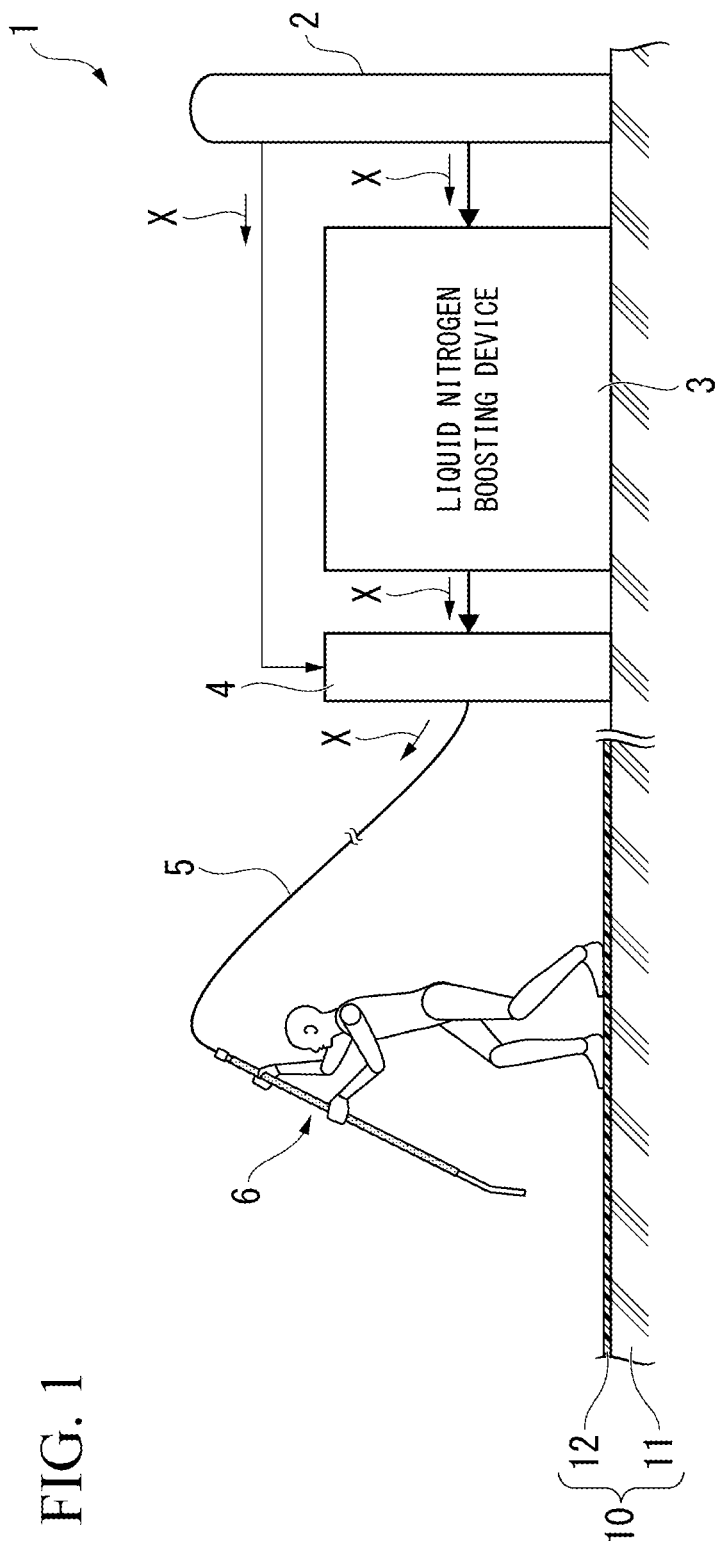
FIG. 1 is a schematic diagram showing a schematic configuration of a liquid nitrogen injection system used in a lining material peeling method according to a first embodiment of the present disclosure.

FIG. 1 is a schematic diagram showing a schematic configuration of a liquid nitrogen injection system 1 used in a lining material peeling method of the present embodiment. As shown in FIG. 1, the liquid nitrogen injection system 1 is equipped with a storage tank 2, a liquid nitrogen boosting device 3, a chiller 4, a flexible hose 5, and a nozzle unit 6.

The storage tank 2 is a pressure tank which stores a liquid nitrogen X, and is connected to the liquid nitrogen boosting device 3 and the chiller 4. The liquid nitrogen injection system 1 may be configured to receive the supply of the liquid nitrogen X from outside, without including the storage tank 2.

The liquid nitrogen boosting device 3 boosts the liquid nitrogen X, which is supplied from the storage tank 2, to a predetermined injection pressure. For example, the liquid nitrogen boosting device 3 is equipped with a boost pump for pumping the liquid nitrogen X, a pre-pump for primarily boosting the liquid nitrogen X sent from the boost pump, an intensifier pump for secondarily boosting the primarily-boosted liquid nitrogen X up to the injection pressure, and the like. The liquid nitrogen boosting device 3 is connected to the chiller 4.

The chiller 4 is a heat exchanger which cools the boosted liquid nitrogen X to an injection temperature, by performing a heat exchange between the liquid nitrogen X heated by being boosted with the liquid nitrogen boosting device 3 and the liquid nitrogen X supplied from the storage tank 2. One end of the flexible hose 5 is connected to the chiller 4.

For example, the liquid nitrogen boosting device 3 and the chiller 4 are unitized and disposed on a single mobile carrier. Since the liquid nitrogen boosting device 3 and the chiller 4 which are unitized, and the storage tank 2 as necessary are disposed in the mobile carrier, the liquid nitrogen injection system 1 can be easily moved. The liquid nitrogen boosting device 3 and the chiller 4 do not necessarily need to be unitized. For example, the liquid nitrogen boosting device 3 and the chiller 4 may be disposed separately, and the chiller 4 may be disposed near the nozzle unit 6. Accordingly, it is possible to suppress the temperature of the liquid nitrogen X, which has been cooled by the chiller 4, from rising before the liquid nitrogen X reaches the nozzle unit 6 and to enhance a jet force of the liquid nitrogen X injected from the nozzle unit 6.

The flexible hose 5 is a hose with flexibility having one end connected to the chiller 4 and the other end connected to the nozzle unit 6. The flexible hose 5 guides the boosted liquid nitrogen X from the chiller 4 to the nozzle unit 6. The flexible hose 5 has pressure resistance and heat insulation, and guides the liquid nitrogen X, which is supplied from the chiller 4, to the nozzle unit 6, while suppressing a decrease in pressure and temperature to a minimum.

Figure 2:
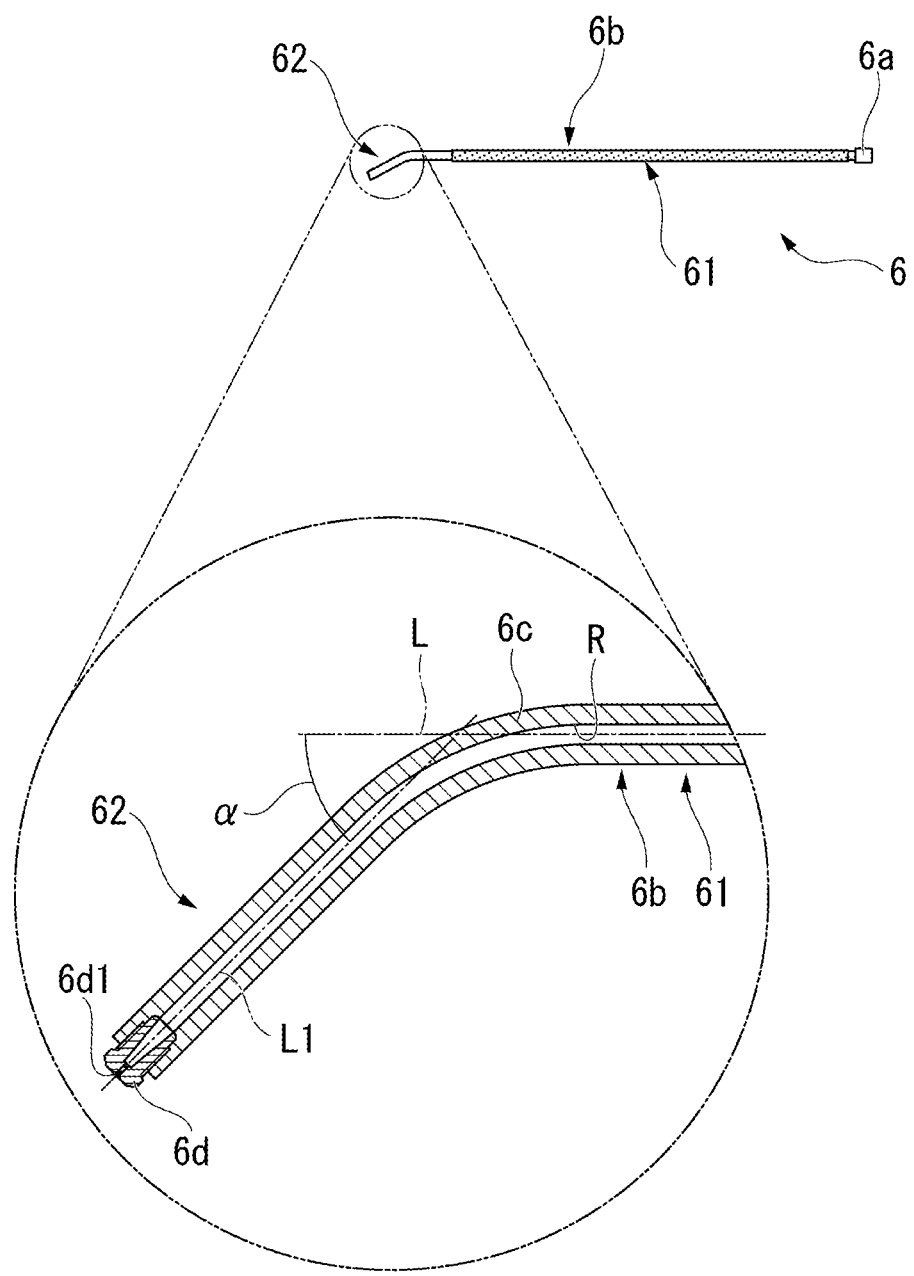
FIG. 2 is an enlarged perspective view showing a schematic configuration of a nozzle unit provided in the liquid nitrogen injection system used in the lining material peeling method according to the first embodiment of the present disclosure.

FIG. 2 is an enlarged perspective view showing a schematic configuration of the nozzle unit 6. As shown in FIG. 2, the nozzle unit 6 is equipped with a connecting portion 6a and a tubular portion 6b. The flexible hose 5 is connected to the connecting portion 6a. A flow path (not shown) is formed inside the connecting portion 6a.

The tubular portion 6b includes a cylindrical trunk portion 6c having a flow path R formed therein, and an orifice portion 6d fixed to the distal end portion of the trunk portion 6c. The trunk portion 6c is, for example, a long pipe-shaped part that is heat-insulated, and guides the liquid nitrogen X from the connecting portion 6a to the orifice portion 6d through the flow path R formed therein along a longitudinal direction thereof. The trunk portion 6c is gripped by an operator when injecting the liquid nitrogen X onto the object. The orifice portion 6d is fixed to the distal end of the trunk portion 6c, and has an injection opening 6d1 for injecting the liquid nitrogen X forward. The injection opening 6d1 is connected to the flow path R of the trunk portion 6c, and the liquid nitrogen X flowing through the flow path R is injected from the injection opening 6d1 to the outside of the tubular portion 6b.

The tubular portion 6b has a straight tubular base portion 61 and a distal end portion 62 including the orifice portion 6d. The base portion 61 is a part on a root side (the connecting portion 6a side) of the trunk portion 6c, and extends linearly along a linear axis L. The distal end portion 62 includes the injection opening 6d1 by having the orifice portion 6d, and injects the liquid nitrogen X. As shown in FIG. 2, the distal end portion 62 is curved and connected to the base portion 61 such that the injection opening 6d1 is opened toward an opposite side of the base portion 61, and an injection direction of the liquid nitrogen X inclines with respect to the axis L of the base portion 61. More specifically, a part of the distal end portion 62 on the base portion 61 side is curved with a constant radius of curvature, a part of the distal end portion 62 on the injection opening 6d1 side has a linear shape, and the part of the distal end portion 62 on the base portion 61 side and the part on the injection opening 6d1 side are integrally connected so that an axis L1 of the distal end portion 62 on the injection opening 6d1 side forms an angle α smaller than 90° (about 45° in the present embodiment) with respect to the axis L of the base portion 61.

The nozzle unit 6 has the tubular portion 6b in which the distal end portion 62 having the injection opening 6d1 is curved and connected to the base portion 61 and which has the flow path R which guides the liquid nitrogen X to the base portion 61 and the distal end portion 62. Further, the tubular portion 6b has the base portion 61 set to have a straight tube shape, and the distal end portion 62 which injects the liquid nitrogen X in a direction inclined with respect to the axis L of the base portion 61.

In the liquid nitrogen injection system 1 including the nozzle unit 6, the liquid nitrogen X is supplied from the storage tank 2 to the liquid nitrogen boosting device 3. The liquid nitrogen X is boosted to the injection pressure by the liquid nitrogen boosting device 3 and then is supplied to the chiller 4. The liquid nitrogen X supplied from the liquid nitrogen boosting device 3 to the chiller 4 is cooled by exchanging heat with the liquid nitrogen X supplied from the storage tank 2 to the chiller 4 through another route. The liquid nitrogen X cooled by the chiller 4 is supplied to the nozzle unit 6 via the flexible hose 5. The liquid nitrogen X supplied to the nozzle unit 6 flows through the flow path R inside the tubular portion 6*b*, and is injected toward the outside from the injection opening 6*d*1.

Figure 3A:
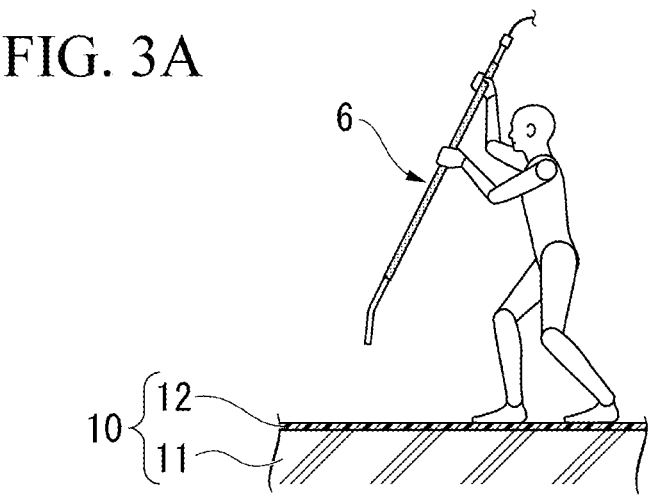
FIG. 3A is a schematic diagram showing the operation of the lining material peeling method according to the first embodiment of the present disclosure.
Figure 3B:
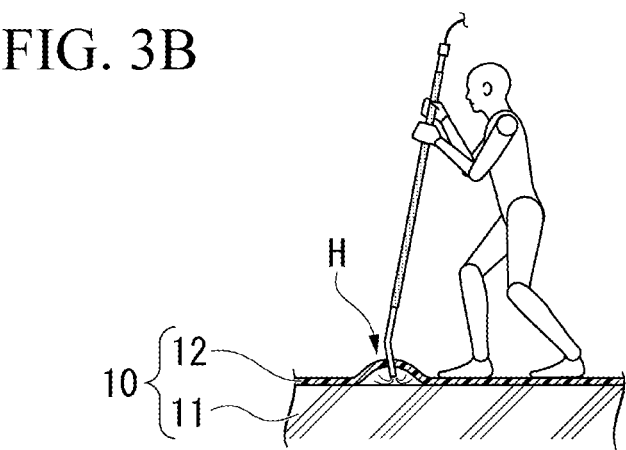
FIG. 3B is a schematic diagram showing the operation of the lining material peeling method according to the first embodiment of the present disclosure.
Figure 3C:
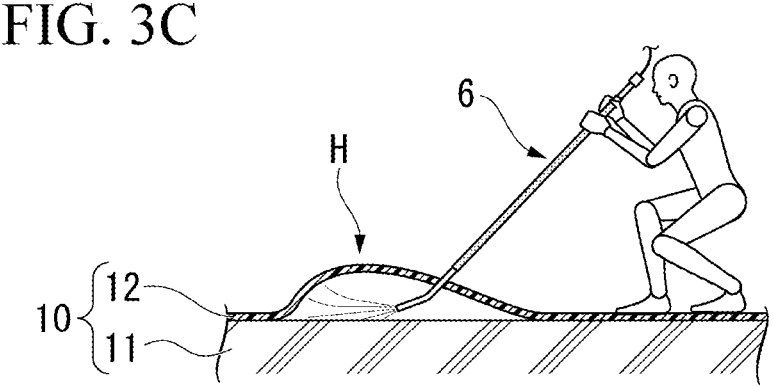
FIG. 3C is a schematic diagram showing the operation of the lining material peeling method according to the first embodiment of the present disclosure.

FIGS. 3A to 3C are schematic diagrams showing the lining material peeling method of the present embodiment. In the present embodiment, a method for peeling a polyurea material 12 from a concrete structure 10 will be described.

The concrete structure 10 has a structure in which the polyurea material 12 as a lining material is fixedly formed on an upper surface (surface) of a concrete material 11 as a base material. When the polyurea material 12 is peeled from the concrete material 11 in the concrete structure 10, an operator first grips the nozzle unit 6 as shown in FIG. 3A. Here, the operator grips the nozzle unit 6 such that the distal end portion 62 of the nozzle unit 6 faces downward.

Subsequently, the operator pushes the distal end portion 62 of the nozzle unit 6 against the polyurea material 12 and injects the liquid nitrogen X onto the surface of the polyurea material 12. When the liquid nitrogen X is locally injected, the polyurea material 12 is locally weakened, and a penetration hole is formed in the polyurea material 12.

Further, as shown in FIG. 3B, when the distal end portion 62 of the nozzle unit 6 enters below the polyurea material 12, the liquid nitrogen X is supplied to a boundary between the concrete material 11 and the polyurea material 12. The liquid nitrogen X is supplied (injected) to the boundary between the concrete material 11 and the polyurea material 12 in a liquid state. The liquid nitrogen X supplied to the boundary between the concrete material 11 and the polyurea material 12 evaporates and expands at the boundary. Due to an expansion force of the liquid nitrogen X when the liquid nitrogen X evaporates, the polyurea material 12 is peeled from the concrete material 11 at a circular region in plan view. That is, as shown in FIG. 3B, the distal end portion 62 of the nozzle unit 6 is made to enter below the polyurea material 12, thereby forming a circular peeling region H in plan view.

Subsequently, as shown in FIG. 3C, as the operator tilts the tubular portion 6*b* with respect to the surface of the polyurea material 12 and rotates the tubular portion 6*b* around the axis L (see FIG. 2) of the base portion 61 in a state in which the distal end portion 62 of the nozzle unit 6 penetrates the polyurea material 12, the injection opening of the nozzle unit 6 is directed forward. In this state, the liquid nitrogen X is injected to the boundary between the concrete material 11 and the polyurea material 12. As a result, at the boundary between the concrete material 11 and the polyurea material 12, the liquid nitrogen X is injected forward as viewed from the operator, and the peeling region H spreads forward. By operating the nozzle unit 6 in this manner, the peeling region H can be easily enlarged.

Figure 4:
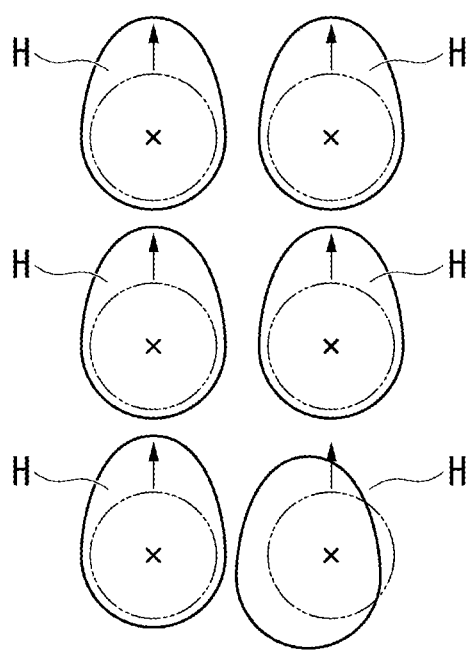
FIG. 4 is a schematic diagram showing the operation of the lining material peeling method according to the first embodiment of the present disclosure.

FIG. 4 is a plan view schematically showing the peeling region H. As shown in FIG. 4, each peeling region H has a circular shape as shown by a two-dot dashed line when the distal end portion 62 of the nozzle unit 6 penetrates the polyurea material 12 as shown in FIG. 3B, and then, by operating the nozzle unit 6 as shown in FIG. 3C, the peeling region H spreads forward. By forming the peeling regions H each having such a shape adjacently as shown in FIG. 4, the entire polyurea material 12 is peeled from the concrete material 11.

According to the lining material peeling method of the present embodiment, the polyurea material 12 is peeled from the concrete material 11 by the expansion force when the liquid nitrogen X evaporates. The expansion rate when the liquid nitrogen X evaporates is about 700 times. For this reason, by utilizing the expansion force of the liquid nitrogen X, the polyurea material 12 can be peeled from the concrete material 11 without heating.

Further, in the lining material peeling method of the present embodiment, liquid nitrogen X is injected onto the surface of the polyurea material 12 to form a penetration hole in the polyurea material 12, and the liquid nitrogen X is injected from the penetration hole to the boundary between the concrete material 11 and the polyurea material 12. Therefore, the liquid nitrogen X can be easily injected to the boundary between the concrete material 11 and the polyurea material 12 without using another device for forming a penetration hole in the polyurea material 12.

Further, in the lining material peeling method of the present embodiment, in a state in which the distal end portion 62 of the nozzle unit 6 penetrates the polyurea material 12, the injection opening of the nozzle unit 6 is directed forward by tilting the tubular portion 6*b* with respect to the surface of the polyurea material 12 and by rotating the tubular portion 6*b* around the axis L (see FIG. 2) of the base portion 61. For this reason, the peeling region H can be easily enlarged by a simple operation.

Further, in the lining material peeling method of the present embodiment, the tubular portion 6*b* of the nozzle unit 6 includes the distal end portion 62 that is curved and connected to the base portion 61, and the distal end portion 62 has the injection opening 6*d*1. Therefore, for example, by rotating the base portion 61 about the axis L, the injection opening 6*d*1 can be easily moved in the circumferential direction when viewed from the base portion 61 side.

Further, in the lining material peeling method of the present embodiment, the tubular portion 6*b* of the nozzle unit 6 has the base portion 61 set to have a straight tubular shape, and the distal end portion 62 which injects the liquid nitrogen X in a direction inclined with respect to the axis L of the base portion 61. For this reason, by rotating the straight tubular base portion 61 about the axis L, the injection direction of the liquid nitrogen X can be easily changed to the circumferential direction, and the injection direction of the liquid nitrogen X can be changed with the minimum necessary operation.

In addition, in the lining material peeling method of the present embodiment, the injection opening 6*d*1 of the distal end portion 62 of the nozzle unit 6 opens toward the side opposite to the base portion 61. For example, it is also possible to tilt the injection opening 6*d*1 with respect to the axis L and direct the injection opening 6*d*1 toward the base portion 61 side. However, by directing the injection opening 6*d*1 toward the side opposite to the base portion 61, since the peeling region H can be expanded toward the front of the nozzle unit 6, it is suitable for peeling or the like of the polyurea material 12.

Second Embodiment

Next, a second embodiment of the present disclosure will be described. In the second embodiment, the explanation of parts the same as those in the first embodiment will be omitted or simplified.

In the aforementioned first embodiment, the configuration in which the polyurea material 12 is peeled from the concrete material 11 using the nozzle unit 6 having the distal end portion 62 that is curved and connected to the base portion 61 has been described. In contrast, in the lining material peeling method of the present embodiment, as shown in FIGS. 5A and 5B, the polyurea material 12 is peeled using a straight tubular nozzle unit 6S.

Figure 5A:
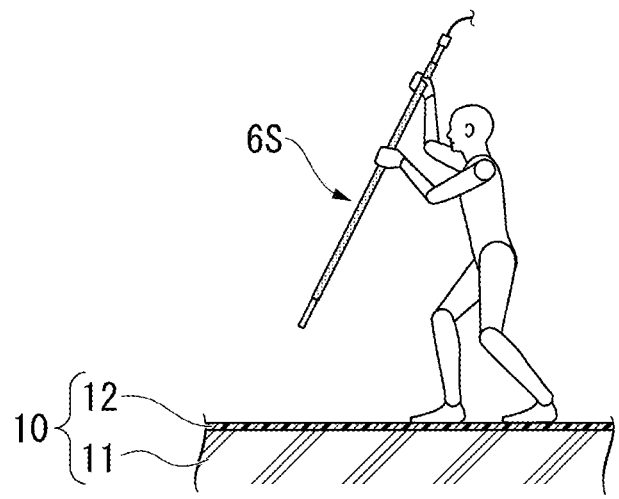
FIG. 5A is a schematic diagram showing the operation of a lining material peeling method according to a second embodiment of the present disclosure.

In this case, first, as shown in FIG. 5A, the operator grips the nozzle unit 6S. Here, the operator grips the nozzle unit 6S so that the distal end portion 62 of the nozzle unit 6S faces downward.

Subsequently, the operator pushes the distal end portion 62 of the nozzle unit 6 against the polyurea material 12 and injects the liquid nitrogen X onto the surface of the polyurea material 12. The polyurea material 12 locally weakens by local injection of liquid nitrogen X, and a penetration hole is formed in polyurea material 12.

Figure 5B:
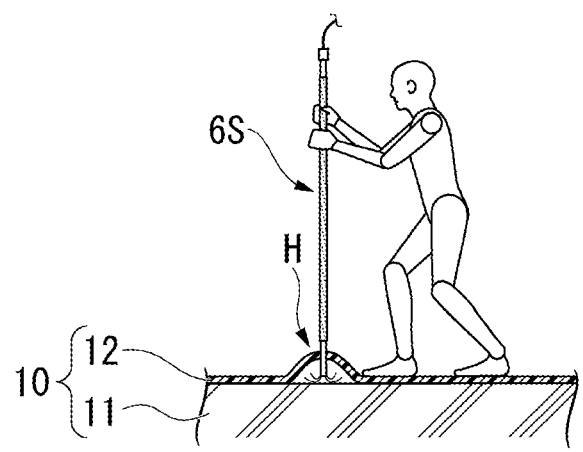
FIG. 5B is a schematic diagram showing the operation of the lining material peeling method according to the second embodiment of the present disclosure.

Further, as shown in FIG. 5B, when the distal end portion 62 of the nozzle unit 6 enters below the polyurea material 12, the liquid nitrogen X is supplied to the boundary between the concrete material 11 and the polyurea material 12. The liquid nitrogen X is supplied (injected) to the boundary between the concrete material 11 and the polyurea material 12 in a liquid state. Due to the expansion force of the liquid nitrogen X when the liquid nitrogen X evaporates, the peeling region H having a circular shape in plan view is formed.

Figure 6:
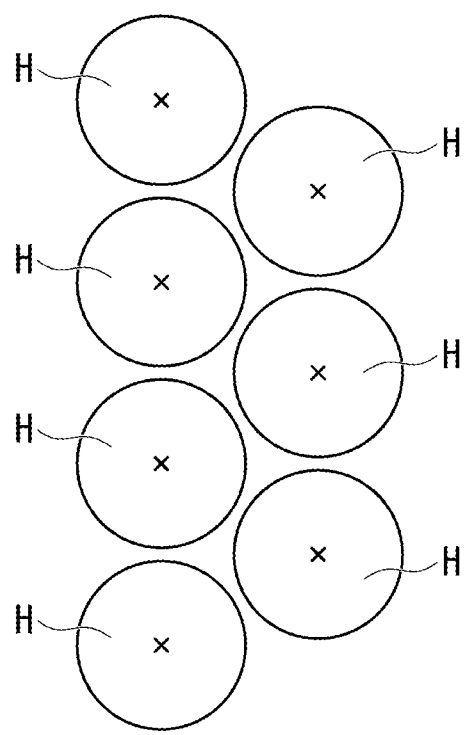
FIG. 6 is a schematic diagram showing the operation of the lining material peeling method according to the second embodiment of the present disclosure.

FIG. 6 is a plan view schematically showing the peeling region H. As shown in FIG. 6, each peeling region H has a circular shape as the distal end portion 62 of the nozzle unit 6 penetrates the polyurea material 12 as shown in FIG. 3B. By forming the peeling regions H adjacently as shown in FIG. 6 in this way, the entire polyurea material 12 is peeled from the concrete material 11.

Also in the lining material peeling method of the present embodiment, the polyurea material 12 is peeled from the concrete material 11 by the expansion force when the liquid nitrogen X evaporates. For this reason, the polyurea material 12 can be peeled from the concrete material 11 without heating, by utilizing the expansion force of the liquid nitrogen X.

First Modified Example of Nozzle Unit

Next, a first modified example of the nozzle unit will be described. In the first modified example, the explanation of the same parts as those in the first embodiment of the present disclosure will be omitted or simplified.

Figure 7:
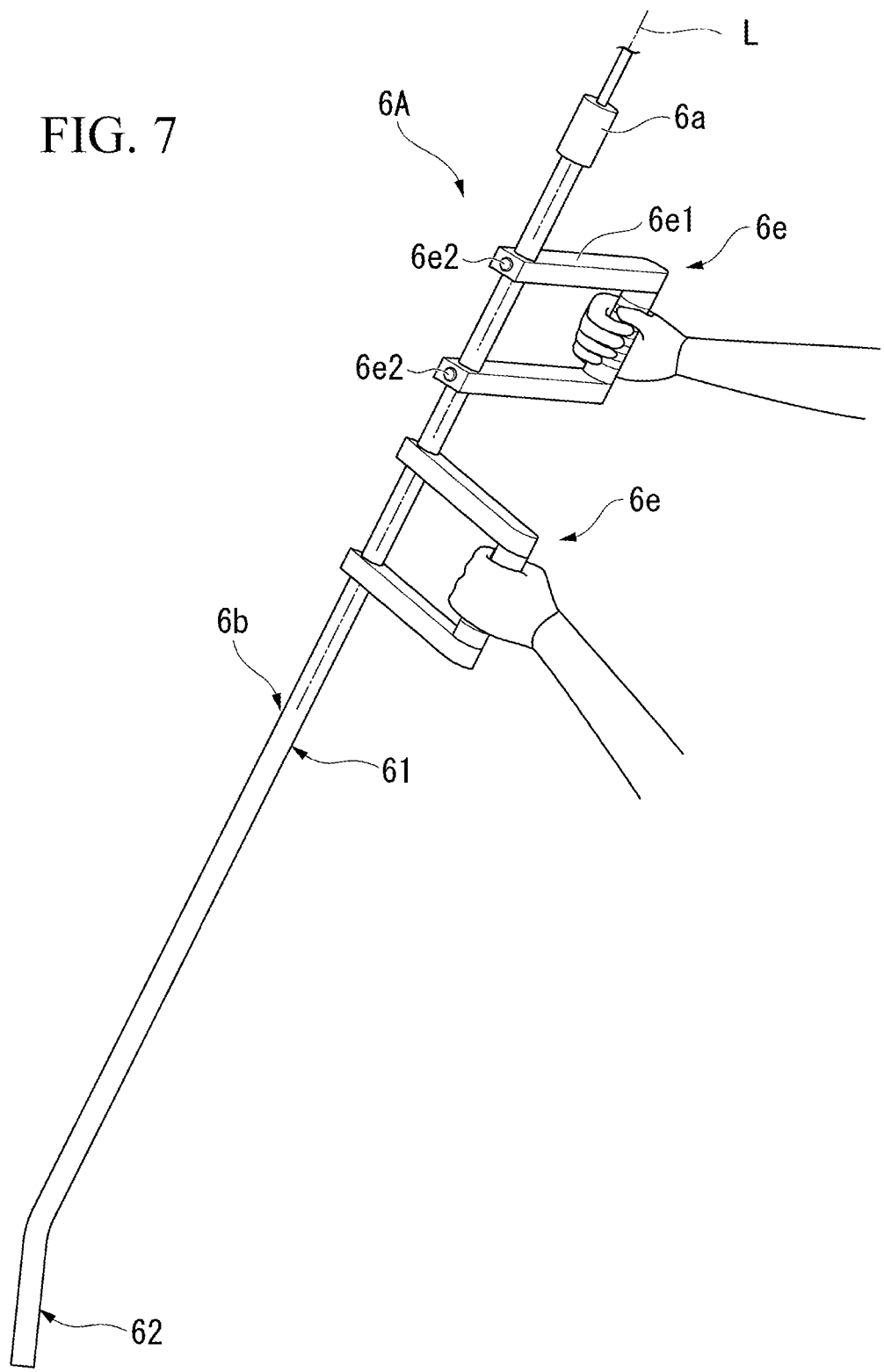
FIG. 7 is an enlarged perspective view showing a schematic configuration of a first modified example of the nozzle unit.

FIG. 7 is an enlarged perspective view showing a schematic configuration of the nozzle unit 6A. As shown in FIG. 7, the nozzle unit 6A is equipped with gripping portions 6e in addition to the configuration of the nozzle unit 6 of the first embodiment.

The gripping portion 6e is attached to the tubular portion 6b and protrudes from the tubular portion 6b to a radially outer side of the tubular portion 6b. As shown in FIG. 7, the gripping portion 6e is attached to the base portion 61 (linear part) of the tubular portion 6b. A plurality (two in the present embodiment) of gripping portions 6e are provided apart from each other in an extending direction of the base portion 61 (an extending direction of the flow path R in the base portion 61).

Figure 8:
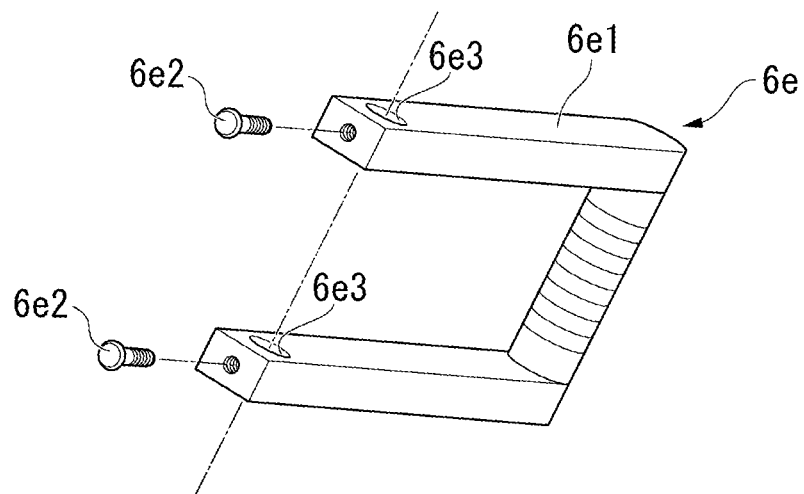
FIG. 8 is an enlarged perspective view showing a schematic configuration of a gripping portion provided in the first modified example of the nozzle unit.

FIG. 8 is an enlarged perspective view showing a schematic configuration of the gripping portion 6e. As shown in FIG. 8, the gripping portion 6e includes a main body portion 6e1 and lock portions 6e2. As shown in FIG. 8, the main body portion 6e1 is a substantially C-shaped part, and penetration holes 6e3 are formed at both end portions of the main body portion 6e1 to be concentric with each other. A diameter of the penetration hole 6e3 is slightly larger than an outer diameter of the base portion 61 of the tubular portion 6b, and the base portion 61 is inserted through the penetration holes 6e3. Further, a screw hole into which the lock portion 6e2 is screwed is formed at each end portion of the main body portion 6e1. Each of the screw holes is connected to the respective penetration hole 6e3 from the radially outer side of the penetration hole 6e3. Thus, the distal end portion of the lock portion 6e2 screwed into the screw hole can be brought into contact with the tubular portion 6b inserted through the penetration holes 6e3.

The lock portion 6e2 is a screw part screwed into the aforementioned screw hole provided in the main body portion 6e1, and is moved in a direction along an axis thereof (a radial direction of the base portion 61 of the tubular portion 6b) by being rotated about the axis. As the lock portion 6e2 is rotated in a tightening direction (a direction in which the lock portion 6e2 moves to the radially inner side of the base portion 61 of the tubular portion 6b), the distal end portion of the lock portion 6e2 comes into contact with the base portion 61 of the tubular portion 6b to regulate the movement of the main body portion 6e1 with respect to the base portion 61 by the frictional force.

The gripping portion 6e is movable along the extending direction (the longitudinal direction) of the base portion 61 of the tubular portion 6b by loosening the lock portion 6e2. Further, the gripping portion 6e is fixed to the tubular portion 6b by tightening the lock portion 6e2.

Further, as shown in FIG. 7, it is preferable to fix the gripping portion 6e disposed on the distal end side of the tubular portion 6b and the gripping portion 6e disposed on the connecting portion 6a side to protrude in different directions about the tubular portion 6b. Accordingly, for example, the gripping portion 6e disposed on the distal end side of the tubular portion 6b can be made to protrude to a left hand side of the operator, and the gripping portion 6e disposed on the connecting portion 6a side can be made to protrude to a right hand side of the operator.

The nozzle unit 6A is equipped with the gripping portion 6e attached to the tubular portion 6b and protruding radially outward from the tubular portion 6b. For this reason, the operator can operate the nozzle unit 6A by gripping the gripping portion 6e, and the operability of the nozzle unit 6A can be improved.

In addition, in the nozzle unit 6A, the plurality of gripping portions 6e are provided apart from each other in the extending direction of the flow path R on the base portion 61 of the tubular portion 6b. For this reason, the operator can stably hold the nozzle unit 6A with both hands, and workability can be improved.

In addition, in the nozzle unit 6A, the two gripping portions 6e protrude in different directions around the tubular portion 6b. For this reason, for example, the operator can grip the nozzle unit 6A with both left and right hands from both sides, and the workability can be further improved.

Further, in the nozzle unit 6A, the gripping portion 6e is attached to be movable in the extending direction of the tubular portion 6*b*. For this reason, the position of the gripping portion 6*e* can be adjusted depending on the working position and the physique of the operator, and the workability can be further improved.

Figure 9:
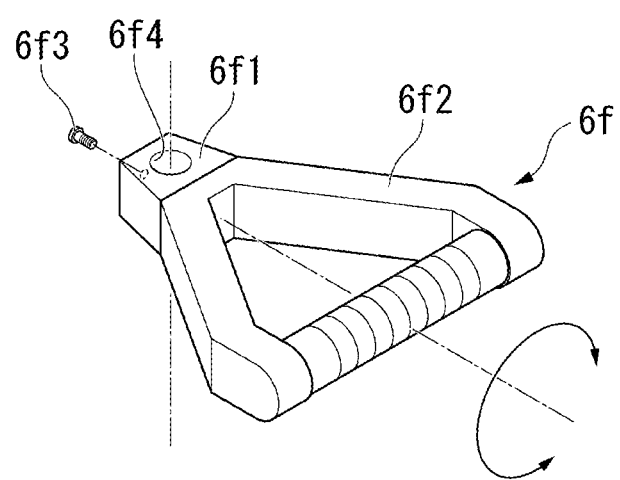
FIG. 9 is an enlarged perspective view showing a schematic configuration of a modified example of the gripping portion provided in the first modified example of the nozzle unit.
Figure 10:
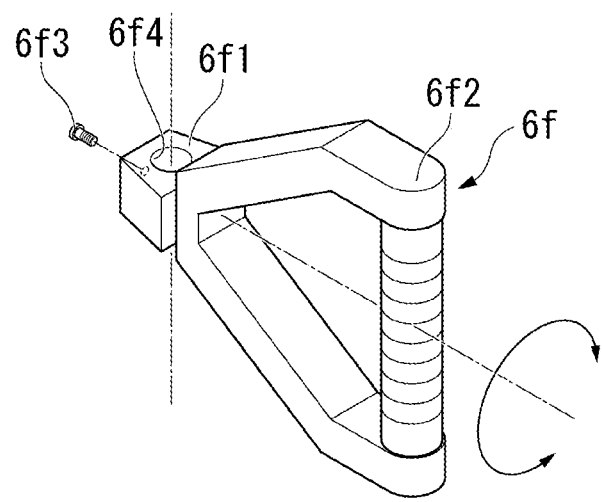
FIG. 10 is an enlarged perspective view showing a schematic configuration of a modified example of the gripping portion provided in the first modified example of the nozzle unit.

Further, as shown in FIGS. 9 and 10, the main body portion 6*f*2 may include a rotatable gripping portion 6*f* instead of the gripping portion 6*e*. The gripping portion 6*f* shown in FIGS. 9 and 10 includes a support portion 6*f*1, a main body portion 6*f*2, and a lock portion 6*f*3.

The support portion 6*f*1 has a penetration hole 6*f*4 having a diameter slightly larger than the outer diameter of the base portion 61 of the tubular portion 6*b*, and the base portion 61 is inserted through the penetration hole 6*f*4. The support portion 6*f*1 rotatably supports the main body portion 6*f*2, as shown in FIGS. 9 and 10. Further, the support portion 6*f*1 has a screw hole into which the lock portion 6*f*3 is screwed. The screw hole is connected to the penetration hole 6*f*4 from the radially outer side of the penetration hole 6*f*4. As a result, the distal end portion of the lock portion 6*f*3 screwed into the screw hole can be brought into contact with the tubular portion 6*b* inserted into the penetration hole 6*f*4.

The main body portion 6*f*2 is a substantially triangular annular part, and one of the apexes thereof is rotatably connected to the support portion 6*f*1. The main body portion 6*f*2 is rotatable about a rotation axis orthogonal to the axis L (see FIG. 2) of the base portion 61 of the tubular portion 6*b*.

The lock portion 6*f*3 is a screw portion screwed into the above-described screw hole provided in the support portion 6*f*1, and is moved in a direction along an axis thereof (the radial direction of the base portion 61 of the tubular portion 6*b*) by being rotated about the axis. As the lock portion 6*f*3 is rotated in a tightening direction (a direction in which the lock portion 6*f*3 moves to the radially inner side of the base portion 61 of the tubular portion 6*b*), the distal end portion of the lock portion 6*f*3 comes into contact with the base portion 61 of the tubular portion 6*b* to regulate the movement of the main body portion 6*f*2 with respect to the base portion 61 by the frictional force.

The gripping portion 6*f* is movable along the extending direction (the longitudinal direction) of the base portion 61 of the tubular portion 6*b* by loosening the lock portion 6*f*3. Further, the gripping portion 6*f* is fixed to the tubular portion 6*b* by tightening the lock portion 6*f*3.

According to the gripping portion 6*f*, since the main body portion 6*f*2 is rotatable with respect to the support portion 6*f*1, the operator can arbitrarily adjust a rotation angle of the main body portion 6*f*2 with respect to the support portion 6*f*1, and the operatability is improved.

Figure 11:
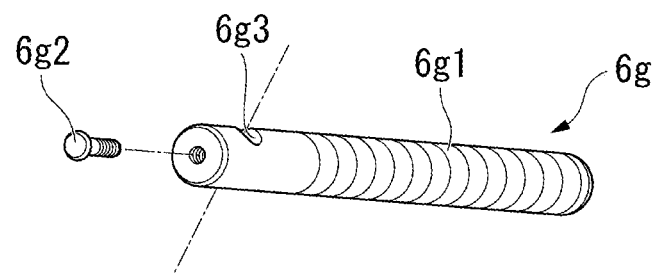
FIG. 11 is an enlarged perspective view showing a schematic configuration of a modified example of the gripping portion provided in the first modified example of the nozzle unit.

Furthermore, as shown in FIG. 11, a gripping portion 6*g* equipped with a rod-shaped main body portion 6*g*1 and a lock portion 6*g*2 may be provided, instead of the gripping portion 6*e*. A concentric penetration hole 6*g*3 is formed at one end portion of the main body portion 6*g*1. A diameter of the penetration hole 6*g*3 is slightly larger than the outer diameter of the base portion 61 of the tubular portion 6*b*, and the base portion 61 is inserted through the penetration hole 6*g*3. Further, a screw hole into which the lock portion 6*g*2 is screwed is formed at the end portion of the main body portion 6*g*1. The screw hole is connected to the penetration hole 6*g*3 from the radially outer side of the penetration hole 6*g*3. Therefore, the distal end portion of the lock portion 6*g*2 screwed into the screw hole can be brought into contact with the tubular portion 6*b* inserted into the penetration hole 6*g*3.

The lock portion 6*g*2 is a screw portion screwed into the above-described screw hole provided in the main body portion 6*g*1, and is moved in a direction along an axis thereof (the radial direction of the base portion 61 of the tubular portion 6*b*) by being rotated about the axis. As the lock portion 6*g*2 is rotated in a tightening direction (a direction in which the lock portion 6*g*2 moves to the radially inner side of the base portion 61 of the tubular portion 6*b*), the distal end portion of the lock portion 6*g*2 comes into contact with the base portion 61 of the tubular portion 6*b* to regulate the movement of the main body portion 6*g*1 with respect to the base portion 61 by the frictional force.

The gripping portion 6*g* is movable along the extending direction (the longitudinal direction) of the base portion 61 of the tubular portion 6*b* by loosening the lock portion 6*g*2. Further, the gripping portion 6*g* is fixed to the tubular portion 6*b* by tightening the lock portion 6*g*2.

Second Modified Example of Nozzle Unit

Next, a second modified example of the nozzle unit will be described. In the second modified example, explanation of the same parts as those in the first embodiment of the present disclosure will be omitted or simplified.

Figure 12:
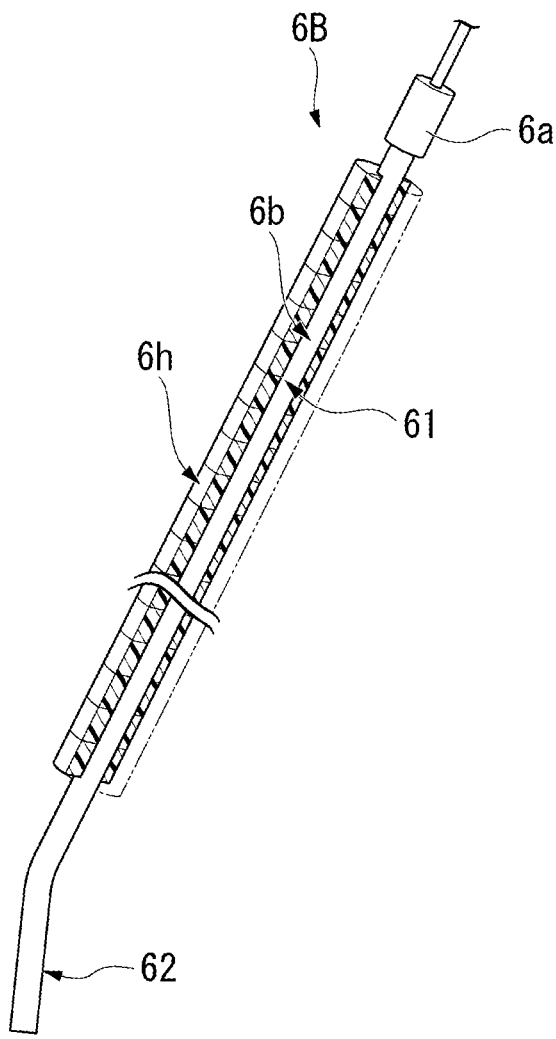
FIG. 12 is an enlarged perspective view showing a schematic configuration of a second modified example of the nozzle unit.

FIG. 12 is an enlarged perspective view showing a schematic configuration of a nozzle unit 6B. As shown in FIG. 12, the nozzle unit 6B is equipped with a heat insulating portion 6*h*, in addition to the configuration of the nozzle unit 6 of the aforementioned first embodiment.

The heat insulating portion 6*h* is fixed to the tubular portion 6*b* to cover the periphery of the base portion 61 of the tubular portion 6*b*. That is, the nozzle unit 6B has the heat insulating portion 6*h* which is fixed to the tubular portion 6*b* and covers the flow path R from the radially outer side. The heat insulating portion 6*h* prevents cold heat of the liquid nitrogen flowing through the flow path R of the tubular portion 6*b* from reaching the operator, and is formed of, for example, a foamed plastic material.

Figure 13:
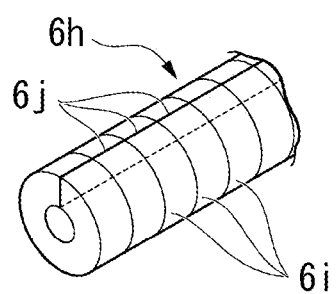
FIG. 13 is a partially enlarged perspective view showing a schematic configuration of a heat insulating portion provided in the second modified example of the nozzle unit.

FIG. 13 is a partially enlarged perspective view showing a schematic configuration of the heat insulating portion 6*h* provided in the nozzle unit 6B. As shown in FIG. 13, the heat insulating portion 6*h* is constituted by a plurality of heat insulating blocks 6*i* arranged continuously in the extending direction of the tubular portion 6*b*. Each heat insulating block 6*i* has an annular shape having a central opening through which the tubular portion 6*b* is inserted, and has a slit 6*j* extending from the outer peripheral surface thereof to the central opening. The slit 6*j* is a part through which the tubular portion 6*b* passes when the heat insulating block 6*i* is attached to and detached from the tubular portion 6*b*. The slit 6*j* can be expanded by elastically deforming the heat insulating block 6*i*, and can pass through the tubular portion 6*b* in the expanded state.

According to the nozzle unit 6B, by attaching and detaching the heat insulating blocks 6*i*, it is possible to change a range in which the heat insulating portion 6*h* covers the tubular portion 6*b*. That is, according to the nozzle unit 6B, the heat insulating portion 6*h* can be divided in the extending direction of the tubular portion 6*b*.

Although the preferred embodiments of the present disclosure have been described with reference to the drawings, the present disclosure is not limited to the aforementioned embodiments. The shapes, combinations, and the like of the constituent members shown in the aforementioned embodiments are merely examples, and can be variously changed on the basis of design requirements and the like, without departing from the spirit of the present disclosure.

For example, in the aforementioned embodiment, the method for peeling the polyurea material 12 from the concrete material 11 has been described. However, the present disclosure is not limited thereto, and may be applied to, for example, a method for peeling a fiber-reinforced plastic material (a lining material) from a metal pipe (a base material).

Further, the configuration in which the liquid nitrogen is used as the liquefied fluid that vaporizes after injection has been described in the aforementioned embodiment. However, the present disclosure is not limited thereto. For example, liquid carbon dioxide or liquid helium may be used as the liquefied fluid.

Further, the configuration in which the distal end portion 62 of the tubular portion 6b is curved and connected to the base portion 61 has been described in the aforementioned first embodiment. However, the present disclosure is not limited thereto, and the distal end portion 62 may be bent and connected to the base portion 61 in the tubular portion 6b.

In addition, in the aforementioned embodiment, since the polyurea material 12 can be peeled from the concrete material 11, the operator can easily recover the polyurea material 12 without using a recovery device or the like. For this reason, it is possible to prevent problems such as clogging of the polyurea material 12 in the recovery device or the like at the time of recovery. However, the present disclosure is not limited thereto, and the polyurea material 12 after peeling may be automatically recovered by a recovery device or the like. Even in such a case, according to the present disclosure, since the polyurea material 12 is not heated and the polyurea material 12 in a state of being detached from the concrete material 11 is recovered, it is possible to reduce the possibility of clogging of the polyurea material 12 in the recovery device or the like, as compared with a case in which the polyurea material 12 is mechanically cut together with the concrete material 11 and removed.

According to the present disclosure, in the lining material peeling method, the lining material can be peeled from the base material without heating.

What is claimed is:

1. A lining material peeling method of peeling a lining material, which is fixedly formed on a surface of a base material, from the base material,
    wherein a liquefied fluid which evaporates after injection is injected to a boundary between the base material and the lining material by a nozzle unit in a state in which a distal end portion of the nozzle unit penetrates the lining material.

2. The lining material peeling method according to claim 1, wherein the liquefied fluid is injected onto a surface of the lining material to form a penetration hole in the lining material, and the liquefied fluid is injected from the penetration hole to the boundary between the base material and the lining material.

3. The lining material peeling method according to claim 1, wherein the nozzle unit includes a tubular body in which a flow path configured to guide the liquefied fluid is formed and which has an injection opening formed at a distal end portion thereof.

4. The lining material peeling method according to claim 3, wherein the distal end portion of the tubular portion is bent or curved and connected to a base portion, and the flow path is formed in a part including the distal end portion and the base portion.

5. The lining material peeling method according to claim 4, wherein, in a state in which the distal end portion penetrates the lining material, the liquefied fluid is injected to the boundary between the base material and the lining material by tilting the tubular portion with respect to the surface of the lining material and by rotating the tubular portion about an axis of the base portion.

6. The lining material peeling method according to claim 1, wherein the base material is a concrete material, and the lining material is a polyurea material.

7. The lining material peeling method according to claim 1, wherein the base material is a metal pipe, and the lining material is a fiber-reinforced plastic material.

8. The lining material peeling method according to claim 1, wherein the liquefied fluid is liquid nitrogen.

* * * * *